Dec. 13, 1966   A. F. MARTIN ETAL   3,290,829
MACHINE FOR GRINDING THE CUTTING EDGE OF A DIE
Filed June 29, 1964   4 Sheets-Sheet 1
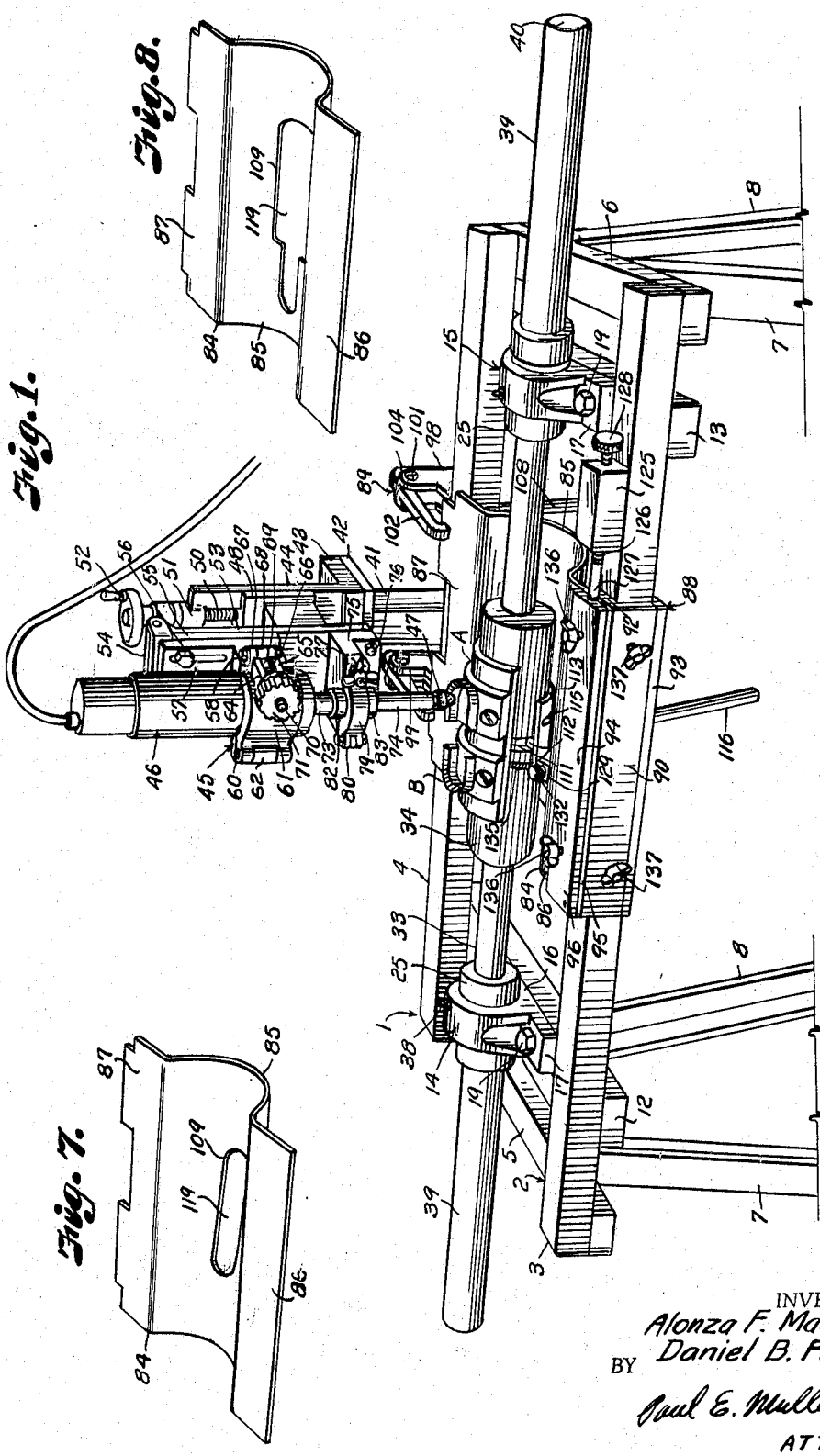
INVENTORS
Alonza F. Martin and
BY Daniel B. Finnigan.
ATTORNEY.

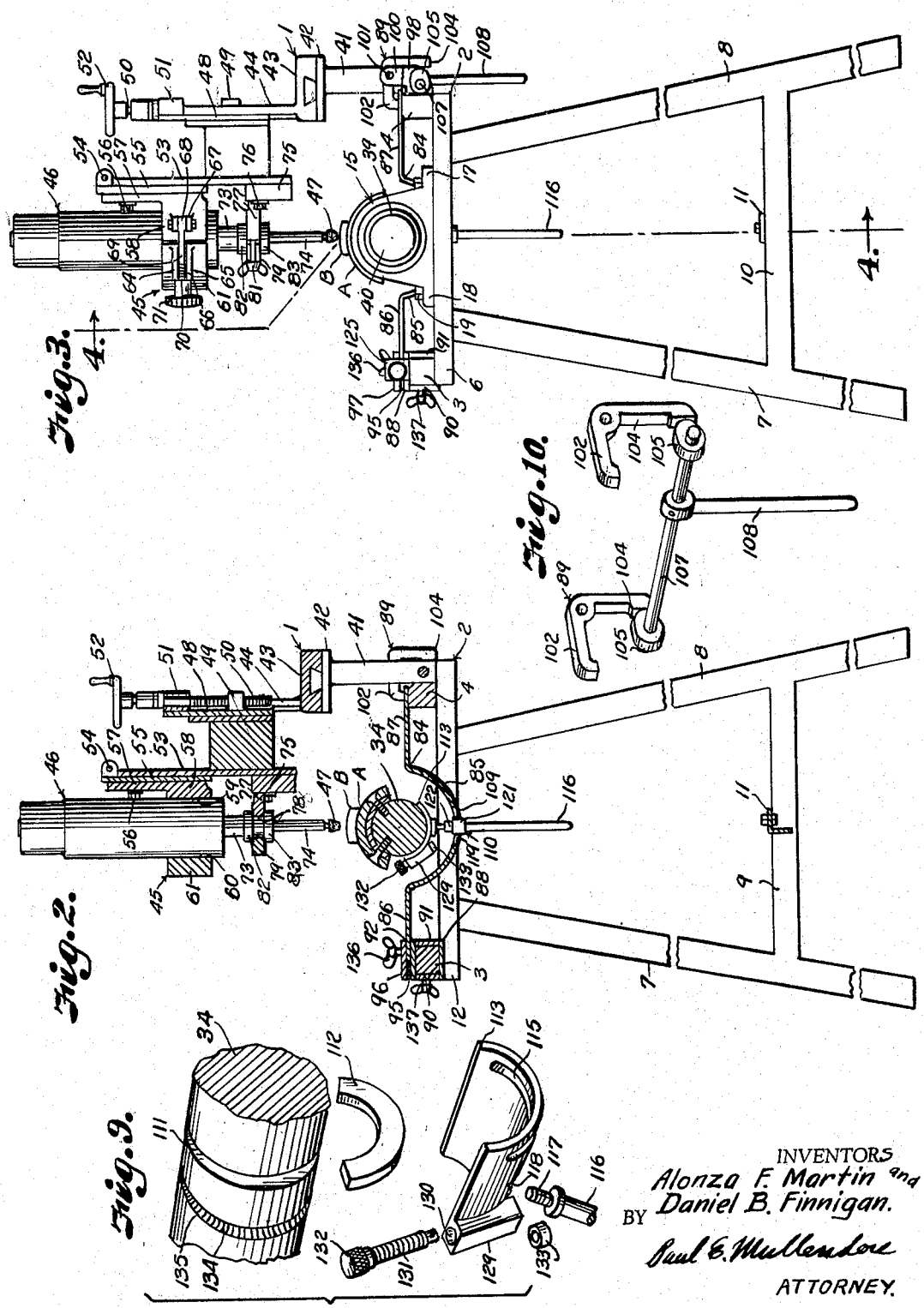

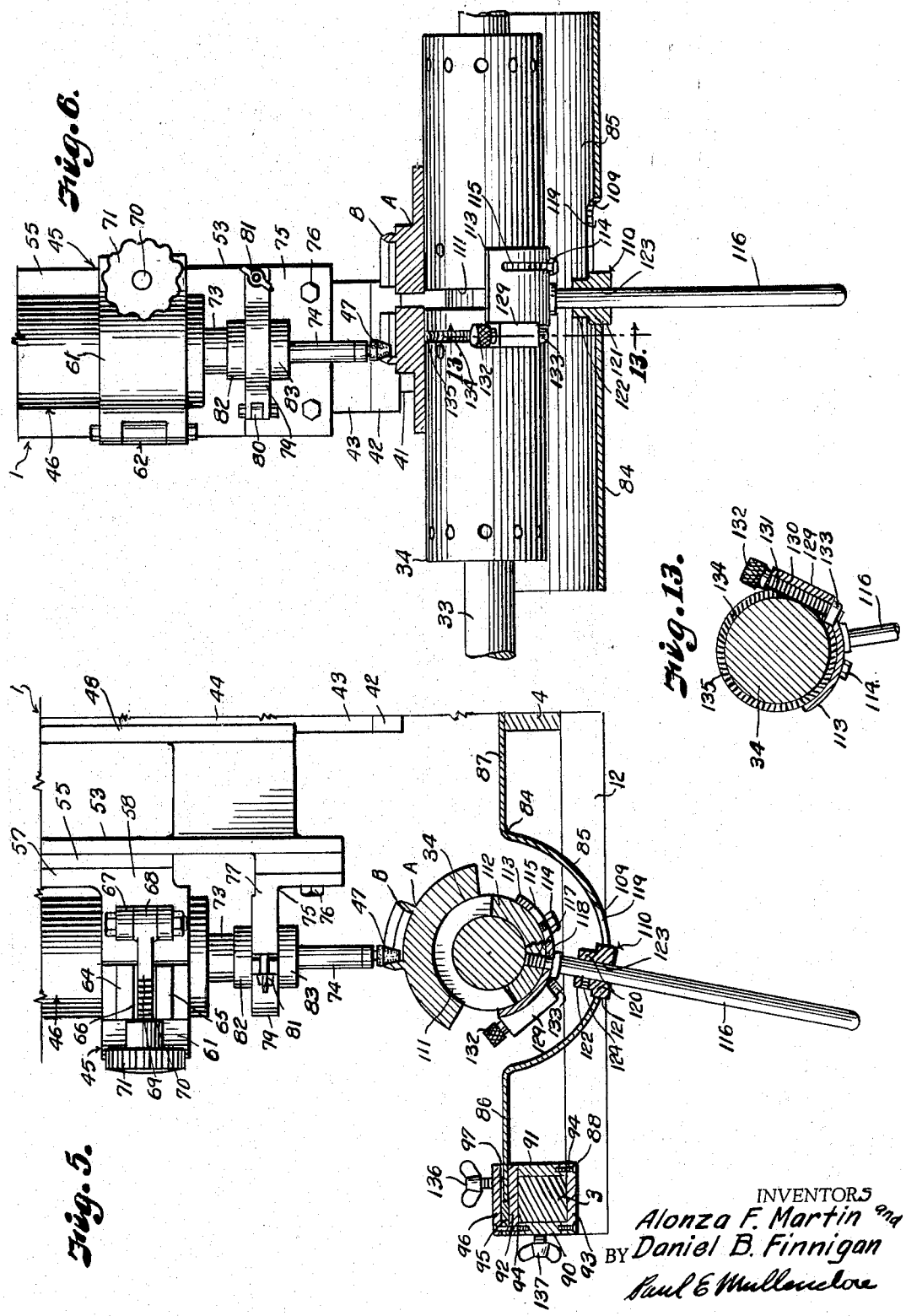

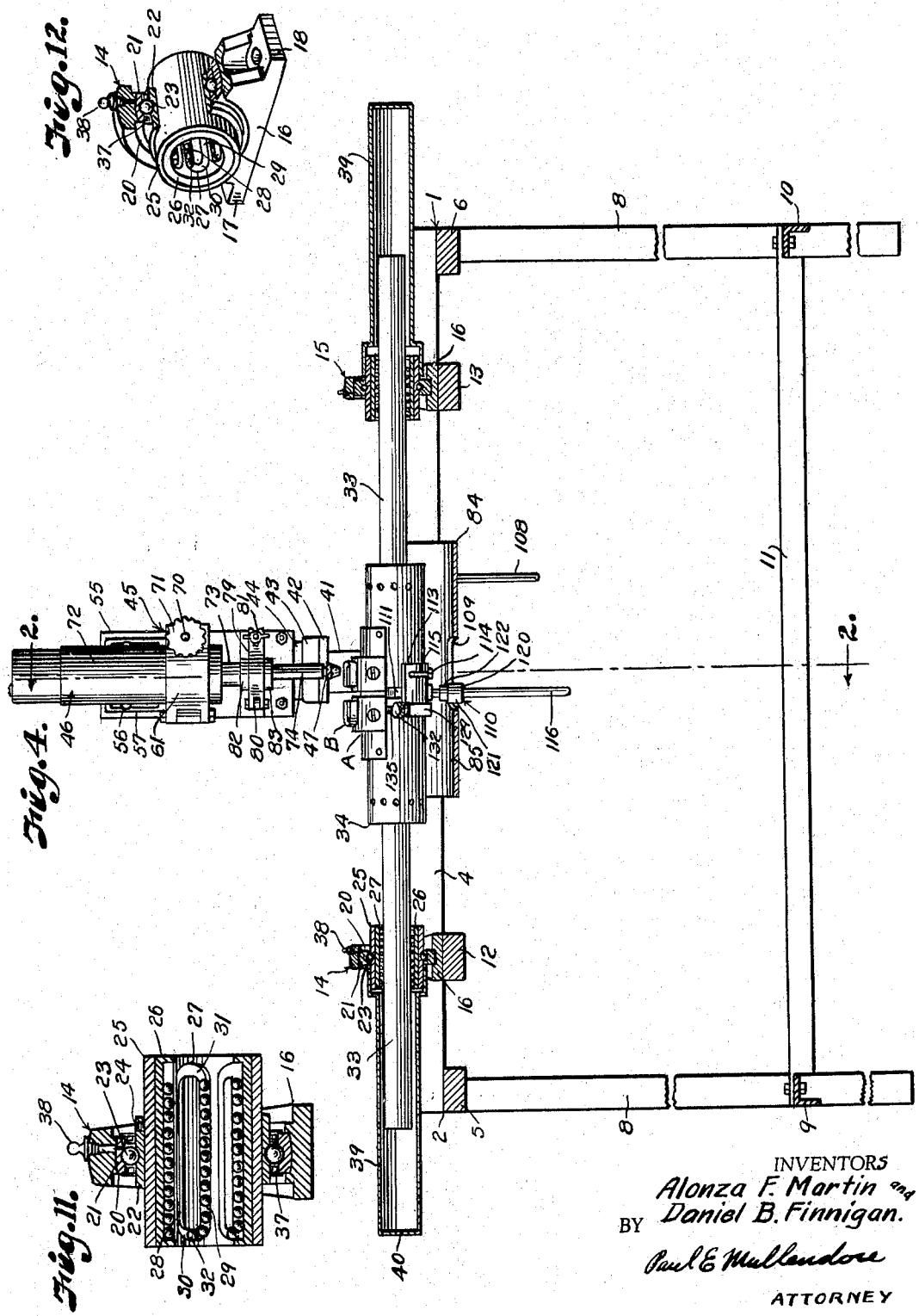

United States Patent Office 3,290,829
Patented Dec. 13, 1966

3,290,829
MACHINE FOR GRINDING THE CUTTING EDGE OF A DIE
Alonza F. Martin, 2411 Farrand Drive, and Daniel B. Finnigan, R.F.D. 14, Box 201, both of Richmond, Va.
Filed June 29, 1964, Ser. No. 378,672
14 Claims. (Cl. 51—100)

This invention relates to grinders, and particularly to a grinder for sharpening blades used in cutting openings of various sizes and shapes in paper and like materials.

For example, in rotary envelope making machines wherein window envelopes are produced from blanks or paper webs, the cutters are carried on a cylinder or cylinders which cooperate with counter rollers in cutting out panels to form the windows in the blanks or webs while they are being conveyed therebetween. Since the cutting edges of the blades are related to the radial axis of rotation and oftentimes at an angle to travel of the blanks, the cutting edges are critical with respect to the surface of the counter rollers. Consequently, the cutting edges are difficult to grind with the precision necessary for cutting the panels uniformly from the blanks or webs around the entire peripheries of the cuts.

It is, therefore, the object of the present invention to provide a machine for quickly setting up and grinding the blades into shape with precision.

In carrying out the invention, the arcuate blocks or saddles that mount the blades on the cylinder or cylinder segments of the envelope making machine are removed from the envelope making machine and mounted in position on a cylinder of like diameter of the grinding machine. The cylinder is oscillatable and movable longitudinally of the rotary axis, to bring the blade into contact with a grinding element rotatable on a fixed grinding head. While the grinding head is fixed, it is adjustable relatively to the cutting edge of the blade when bringing the grinding element into and out of contact with the blade. The machine is also equipped with means for mounting a template in fixed relation with respect to the rotational axis of the grinding element and having a cam track conforming in general shape to the shape of the blade.

Other objects of the invention are to provide antifriction bearing means for supporting the blade mounting cylinder, and in which the cylinder shaft oscillates and slides longitudinally of the axis of oscillation without lost motion and with a minimum of friction; to provide adjustment of the cam follower on the mounting cylinder for positioning the cutter in relation to the template; and to provide adjustment of the template with respect to the grinding element whereby the grinding machine is adapted for grinding any shape of cutter or any position of the cutter on its saddle.

Other objects of the invention are to provide means for minutely adjusting the grinding element to the cutter, and also to provide a quick movement of the grinding element into and out of contact with the cutter without affecting the minute adjustment.

In accomplishing these and other objects of the invention, we have provided improved structure, the preferred form of which is illustrated in the accompanying drawings, wherein:

FIG. 1 is a perspective view of a grinding machine constructed in accordance with the present invention, and showing set-up of the machine for grinding the cutters which form the rounded ends of a window opening in an envelope blank.

FIG. 2 is a vertical transverse section through the approximate center of the machine, and taken on the line 2—2 of FIG. 4.

FIG. 3 is an end view of the machine.

FIG. 4 is a longitudinal section through the machine, particularly illustrating the mounting of the shaft which supports the cutter mounting cylinder.

FIG. 5 is an enlarged fragmentary transverse section, to better illustrate the grinding operation.

FIG. 6 is an enlarged fragmentary section taken longitudinally of the machine, to better illustrate the construction.

FIGS. 7 and 8 are perspective views of different templates for use in the machine.

FIG. 9 is a fragmentary perspective view of a porton of the cylinder and the handle parts which adjustably carry the cam follower on the cylinder.

FIG. 10 is an enlarged perspective view of the clamp for anchoring the rear side of the template.

FIG. 11 is an enlarged section through one of the shaft bearings illustrated in FIG. 4.

FIG. 12 is a perspective view of the bearing, with parts broken away to better illustrate the construction.

FIG. 13 is a fragmentary section on the line 13—13 of FIG. 6.

Referring more in detail to the drawings:

1 designates a grinding machine constructed in accordance with the present invention, and particularly adapted for grinding of rotary cutters of the type used in a rotary envelope making machine for cutting out panels in the blanks or webs from which envelopes are formed.

The grinder includes a frame 2, having spaced apart front and rear rails 3 and 4 connetced together at the ends by transverse end rails 5 and 6. Welded or otherwise rigidly attached to the end rails are front and rear legs 7 and 8 for supporting the frame 2 from the floor at a convenient working height. The front and rear legs are connected near their lower ends by tie bars 9 and 10, and the tie bars 9 and 10 are connected by a longitudinal bar 11. Fixed to the front and rear rails in inwardly spaced relation with the end rails 5 and 6 are similar rails 12 and 13.

Mounted on the rails 12 and 13 substantially midway between the front and rear rails 5 and 6 are bearing blocks 14 and 15. The bearing blocks are best illustrated in FIGS. 11 and 12, and each includes a bracket 16 having laterally extending feet 17 and 18 secured to the rails 12 and 13 by fastening devices, such as bolts 19. The brackets contain therein an antifriction bearing 20, having an outer race 21 fixed therein and an inner race 22 supported in the outer race on balls 23 in a manner to resist longitudinal or side thrusts on the inner race.

Fixed within the inner races by set screws 24 are sleeve-like housings 25 containing a sleeve 26 having a fixed press fit within the housing 24. Formed in the inner periphery of the sleeves are a series of parallel longitudinal raceways 27, located in spaced apart relation about the axis of rotation of the housings 25. Each raceway is formed by spaced apart longitudinal grooves 28 and 29 interconnected at the ends of the sleeve by substantially semicircular grooves 30 and 31. Mounted in one of the longitudinal grooves of each raceway are a series of balls 32 supporting a shaft 33 and adapted to roll through one of the grooves 30 or 31 into the other and back again upon reciprocation of the shaft.

The shaft 33 constitutes a support for a cylinder 34 having an outer cylindrical surface conforming to the diameter of the cutter cylinders of an envelope making machine, not illustrated. The cylinder 34 need be of a length only to accommodate thereon saddles A that carry the cutters B on the cylinders (not shown) of the envelope making machine, so that there is ample room provided between the ends of the cylinder and adjacent inner sides of the bearing blocks to reciprocate the cylinder therebetween at least the length of the cylinder. The ends of the shaft 33, being mounted in the bearing, project from the outer sides of the bearing a sufficient distance to maintain support of and to guide the ends of the shaft when the cylinder 34 is reciprocated between the bearing blocks, as later to be described.

With the construction thus far described, it is obvious that when the shaft 33 is oscillated about its longitudinal axis it may turn freely within the bearing blocks by reason of the balls 23, and when the shaft is reciprocated or moved longitudinally with respect to the bearing blocks, the balls 32 provide substantially free movement thereof without any play in radial directions.

It is apparent that the cylinder member mounted as described has in effect a substantially universal movement, so that the cutting blade, when carried thereon, may be caused to move along the grinding element regardless of the shape of the cutter.

The inner and outer races may be provided with oil seals 37 at the respective sides of the balls 23 to retain a lubricant that is supplied through grease fittings 38 carried by the bearing blocks 14 and 15. Fixed to the outer ends of each sleeve-like housing 25 is a tubular housing 39 of ample length to accommodate the necessary reciprocatory movement of the shaft 33 and provide for closing the ends thereof, as indicated at 40 (FIG. 4).

The cutter will best be positioned on the top side of the cylinder, so that it remains in view of the operator during a grinding operation. Therefore, the grinding element and the mechanism which rotates it are carried over the cylinder, as now to be described.

Fixed midway of the rear rail 4 is a post 41 that extends upwardly above the cylinder 34 and carries a horizontal head plate 42 for attaching the base 43 of a vertically positioned guide 44. Slidably mounted on the guide 44 is a vertically movable carriage 45 for a motor unit 46 which rotates the grinding element 47 of the machine.

The carriage includes a face plate 48 that slides in bearing contact on the guide 44 and has a lug 49 to connect with a threaded shaft 50 extending vertically at the rear of the guide and which is journaled in a bearing 51 at the upper portion of the guide 44, as best shown in FIG. 2. The shaft 50 is rotated by a hand wheel 52 fixed to the upper end thereof for raising and lowering the carriage on the guide.

In addition, the carriage includes a plate 53 carried from the plate 48. Secured to the upper portion of the plate 53 by a horizontally located hinge connection 54 is a hinge plate 55. Vertically adjustable on the hinge plate 55 by fastening devices 56 is a plate 57.

Extending forwardly from the adjustable plate 57 is a block 58 having a substantially semicircular seat 59 extending vertically thereof to cooperate with a similar seat 60 in a gate 61 for clamping the respective opposite sides of a motor unit 46. The gate 61 is connected with the block 58 at one side thereof by a hinge 62. The opposite side of the gate has laterally extending lugs 64 and 65, spaced apart to provide a slot 66 therebetween. Extending from the complementary side of the block 58 are spaced apart ears 67 for hinging therebetween the head 68 of a bolt 69 that swings into and out of the slot 66 and which has a threaded end 70 mounting a clamping nut 71 thereon that seats against the lugs 64 and 65 to clamp the motor unit 46 between said seats.

The motor unit 46 includes a motor and a built-in gearing enclosed within the cylinder casing 72 and which has on the lower end a tubular housing 73 for a driven shaft 74. The tubular housing 73 is secured to the lower portion of the plate 53 by means of a bracket 75 that is secured thereto by fastening devices 76. The bracket 75 has forwardly projecting flange 77 having a substantially semicircular seat 78 therein that accommodates the drive shaft housing. The drive shaft housing 73 is releasably retained in the seat 78 by means of a gate 79 attached to one side of the flange 77 by a hinge 80 and at the other side by a clamp screw 81. The drive shaft housing may be provided above and below the gate with thrust collars 82 and 83. A grinding element 47 is fixed to the lower end of the driven shaft and may be of various shapes, depending upon the contour of the blades to be ground.

When the motor unit is clamped to the face plate, the axis of the driven shaft is located in the vertical plane that extends through the axis of the cylinder 34.

The cutters to be ground on the cylinder are of the many shapes used in a rotary envelope making machine. They may be continuous cutters to cut around the entire panel, or made up of a plurality of sections of the type to be mounted on individual rollers. For example, one roller of the envelope making machine carries the sections of the cutter to make the parallel cuts, and another roller mounts the cutters forming the end cuts. The cutters may also be of a shape to make irregular openings. Therefore, the present invention also includes templates each having a cam track which, when followed by a follower on the cylinder, guides movement of the cylinder 34 so that the particular cutting blade carried thereon can be kept in contact with the grinding element of the machine.

The templates 84 are each constructed of substantially rigid sheet material and shaped to provide transversely arcuate trough portion 85 to extend parallel with the axis of rotation of the cylinder 34. Extending along the front and rear edges of the trough portion 85 are lateral flanges 86 and 87. The front flange 86 is clamped to a slide 88 that is adjustable along the front rail 3 of the frame, and the rear flange 87 seats on the upper face of the rear rail 4, to be clamped thereto by a clamp mechanism 89. The slide 88 includes plates 90 and 91 that engage the side faces of the front rail, and upper and lower plates 92 and 93 that engage the top and bottom faces of the rail, as illustrated in FIGS. 1 and 2. The plates are suitably secured together at the edges by screws 94 to hold them in a unit about the rail. Extending along the upper plate at the front thereof is a spacer 95 for a top plate 96 that is attached to the spacer and overhangs the inner marginal portion of the plate 92 to provide a longitudinal groove 97 to accommodate therein the front flange 86 of the template. The top plate and spacer may be secured by certain of the screws 94.

The clamp mechanism 89 is carried on brackets 98 and 99 at opposite sides of the post 41 and secured to the rear rail 4. The brackets have upstanding ears 100. Pivotally mounted between the ears on pins 101 are clamp arms 102, with their forward ends projecting over the rear flange 87 of the template. The clamp arms at the rear of the pivot pins 101 terminate in depending arms 104 that are engaged with cams 105—105 to urge the free ends of the arms 102—102 into clamping engagement with the rear flange 87 of the template. The cams 105—105 are carried on a rock shaft 107, which may be journaled in the brackets 98 and 99, and which is adapted to be oscillated by a depending lever 108.

The trough portions 85 are provided with a cam track 109, conforming to the shape of the cutter blade, and which control the movements of the cylinder 34 through the follower 110, as now to be described.

Formed midway in the cylinder 34 is an annular groove 111, and adjustable therein in a circumferential direction is an arcuate shoe 112 retained in the groove by an arcuate plate 113 engaging the outer surface of the cylinder 34, and which is adjustably secured thereto by a fastening device such as a machine screw 114 extending through an arcuate slot 115 in the plate 113 and threaded into the body of the cylinder 34. The arcuate shoe 112 is connected to the plate 113 by a control lever 116, having a threaded end 117 extending through an opening 118 (FIGS. 9 and 5) in the plate 113 and threaded into the arcuate shoe 112, as shown in FIG. 5. The control lever 116 depends through the opening 119 in the template that provides the track 109 and control lever carries the follower 110 thereon.

The follower 110 is a cylinder member having stepped annular portions 120 of different diameter to provide an annular template-contacting face 121 of large diameter and a similar face 122 of smaller diameter. The follower 110 has an axial bore 123 extending therethrough to accommodate the control lever 116. With the follower 110 mounted on the control lever 116, it is adjustable thereon to bring one or the other of the faces 121 or 122 in contact with the cam track, after which it is secured to the control lever 116 by a set screw 124 (FIG. 5). It is apparent that the control lever 116 controls the oscillatory and longitudinal movement of the cylinder 34 when the follower 110 is caused to follow the track 109.

In order to adjust the template and position the cam track 109 with respect to the grinding element, the front rail 3 has fixed thereto a block 125 which has a threaded pin 126 threadedly mounted therein to extend longitudinally of the rail, so that a projecting end 127 of the pin may form a stop for the slide 88 (FIG. 1). The threaded pin 126 is turned in the block by a knurled head 128 that is carried thereon.

In order to provide a fine adjustment for positioning the follower 110 with respect to the cutter mounted on the cylinder 34, the plate 113 has a lug 129 fixed thereto and which has a longitudinal bore 130 extending therethrough for rotatably mounting and adjusting screw 131 that is retained in the bore by a knurled head 132 at one end and a collar 133 fixed to the other end, to engage the respective ends of the lug 129, as best shown in FIG. 13. The bore 130 that extends through the lug 129 intersects the concave side of the plate 113 and carries the adjusting screw 131, so that the threads of the screw project to engage threads 134 on the bottom of an annular groove 135 extending about the circumference of the cylinder, as best shown in FIGS. 6 and 13. It is apparent that by turning the head 132 of the adjusting screw, the threads thereon engaging the threads 134 will cause the plate 113 and the control lever carried therewith, to move slowly about the axis of the cylinder, thereby adjusting the position of the follower 110 relatively to the cutter which has been attached to the cylinder 34.

The flange 86 of the template is clamped to the slide by thumb screws 136 that are threadedly mounted in the top plate 96. The slide is fixed in an adjusted position on the rail 3 by similar thumb screws 137 carried by the plates 90 of the slide.

In using the grinding machine constructed as described, the cutters to be sharpened are removed from the cylinder of the envelope making machine by removing the saddle "A" to which the blades "B" are attached, and applying the saddle to the cylinder 34 of the grinding machine. In the illustrated instance of FIG. 1, the cutter blades "B" are of a type to cut the circular ends of a window opening in an envelope blank, therefore, a template 84 will be selected having an opening 119 therein which provides an elongated track 109 having rounded ends and of a size to give the required oscillatory and longitudinal movement of the cylinder 34.

The template which is selected will be mounted in the machine by sliding it under the cylinder 34 with the control lever 116 removed, so that the flange 86 will be seated in the groove 97 to rest upon the slide plate 92 of the slide 88. The flange 87 will then be in position to seat on the rear rail 4 under the clamping arms 102. The set screws 136 are tightened against the flange 86 of the template, to fix the template to the slide 88. The slide 88 is now adjusted so that the center of the openings 119 of the template aligns with the center of the saddle "A." The slide may be easily adjusted with accuracy by the pin 127. With the template now positioned, the screws 137 will be tightened to fix the slide from movement. The clamp arms 102 are now moved into position to clamp the rear flange 87 of the template. The arms 102 are moved into clamping position by grasping the depending lever 108 and pulling it forwardly to rock the cam shaft 107 and cause the cams 105 to engage the arms 104. This movement of the cams rocks the arms 104 in a rearward direction, and applies clamping pressure on the arms 102 against the flange of the template. The cams 105 are shaped to lock against the arms 104 and hold the clamping pressure, so that grip on the lever 108 may be released.

The control lever 116 will be replaced with the track follower 110 thereon. If the outside edges of the cutter blades are to be ground, the smaller face 122 will be used to engage the track 109. If the blades are to be ground on the inside, as shown, the larger face 121 will be used to engage the track 109. When the follower is properly positioned, the set screw 124 will be tightened to fix the follower from movement on the control lever. The follower 110 is now fixed with respect to the cylinder 34. To adjust the follower with respect to the surfaces to be ground, the fastening device 114 is loosened and the knurled head 132 on the screw 131 will be turned to shift the arcuate plate 113 in the proper direction. Since the screw 131 is journaled in the lug 129, with the threads thereon engaging the threads 134 in the groove 135, the position of the control lever on the cylinder will shift until the track follower 110 is in proper position and the cutter blade properly contacts the grinding element, after which the screw 114 is retightened. The control lever 116 is now fixed with respect to the circumferential direction of the cylinder 34 by the screw 114 and in a longitudinal direction because of the shoe 112 engaging in the groove 111 of the cylinder.

The grinding element 47 is brought to the level of the work by operating the hand wheel 52. With the motor 46 in operation and the grinding element in operation, the blade of the cutter is brought into contact with the grinding element 47 by swinging the lever 116 to hold the follower 110 in contact with the track 109 of the template, and at the same time applying pressure sidewise on the lever to cause the curvature of the blade to remain in contact with the grinding element. It is obvious that the shaft portions 33 will move axially through the bearing blocks 14 and 15, with the balls 32 rolling from one groove of the sleeve 26 into the other. Also, the shaft portions will turn within the annular bearings 20.

If for some reason it is desired to remove the grinding element from contact with the work, this may be accomplished without disturbing the setting of the grinding element by the hand wheel 52, merely by releasing the gate 79 and swinging the motor unit 46 outwardly on the hinge connection 54.

The grinding element may be returned to operation by simply hinging the motor unit to return the shaft housing 73 to its seat 78, where it is retained after the gate 79 is closed and secured by the clamp 81.

In the case of grinding the parallel cutter blades which complete the window opening, a template as shown in FIG. 7 is used. Usually such blades are set at a bias on the saddle, in which case the opening 119 in the template will be at a corresponding bias. If irregular blades are to be ground, a template of the type shown in FIG. 8 is used.

What we claim and desire to secure by Letters Patent is:

1. A machine for grinding the cutting edge of a die of the type for cutting openings in envelope material and which die is carried on a rotating die cylinder of a rotary envelope making machine, said grinding machine including
   a template providing a track following the shape of the cutting edge of a die to be ground,
   a die support having a generally cylindrical body with the outer cylindrical surface conforming to the diameter of the cylindrical surface of the die carrying cylinder of the envelope making machine,
   means movably mounting the die support on a fixed axis coextensive with the axis of the cylindrical body for oscillation on said axis and for reciprocation longitudinally with respect to said axis,
   means for mounting the die to be ground upon said cylindrical surface of the die support,
   a rotary grinding element,
   means carrying the grinding element for rotation on an axis at substantially right angles to the axis of oscillation and in position to be contacted by the cutting edge,
   actuating means connected with the die support for moving the die support and carrying a part in position to ride upon the track of the template to control said oscillatory and reciprocatory movement of the die support for maintaining contact of the cutting edge of the die with respect to the grinding element.

2. A machine for grinding the cutting edge of a die of the type for cutting openings in envelope material and which is carried on a rotating cylinder of a rotary envelope making machine, said grinding machine including
   a frame having template seating means,
   a template providing a track following the shape of the cutting edge of a die to be ground and said template having portions engaging upon said seating means for supporting the template on the frame,
   a die support having a generally cylindrical body with the outer cylindrical surface conforming in diameter with the cylindrical surface of the die carrying cylinder of the rotary envelope making machine,
   means on the frame mounting the die support on a fixed axis over the track of the template for oscillation on said axis and for reciprocation longitudinally of said axis,
   means for mounting the die to be ground upon said support,
   a rotary grinding element,
   means carrying the grinding element on the frame on the side of the die support opposite the template to rotate on an axis transversely of the fixed axis and in contact with the cutting edge of the die, and
   means carried from the die support to provide means for moving the die support on its supporting means and having a part in position to ride upon the track of the template during movement of the die support for controlling contact of the cutting edge of the die with respect to the grinding element.

3. A machine for grinding the cutting edge of a die as described in claim 2, wherein said means on the frame which mounts the die support includes
   a shaft extending in opposite directions from ends of the die support,
   antifriction means supporting ends of the shaft for said reciprocatory movement, and
   antifriction means circumferentially of the first named antifriction means for said oscillatory movement of the die support.

4. A machine for grinding the cutting edge of a die as described in claim 2, wherein said means on the frame which mounts the die support includes
   a shaft extending in opposite directions from ends of the die support,
   bearing blocks on the frame for passing said shaft,
   sleeve members in the bearing blocks and having pairs of parallel grooves in the inner face of the sleeve with ends of each pair of grooves interconnected by transfer grooves,
   balls in one groove of each pair for supporting the shaft and movable from one groove of a pair to the other groove when the shaft is reciprocated,
   tubular housings containing the sleeve members, and
   antifriction bearings rotatably journaling the sleeve members in the bearing blocks for oscillation of the die support.

5. A machine for grinding the cutting edge of a die of the type for cutting openings in envelope material while under movement through an envelope making machine, said grinding machine including
   a frame having front and rear rails connected by rails near ends thereof,
   a slide movable along the front rail and having a template seat,
   a template having an opening therein providing a track following the shape of the cutting edge of a die to be ground and said template having a portion engaging upon said seat of the slide and an opposite portion seated upon the rear rail for carrying the template between said rails,
   a cylindrical die support having shaft portions extending axially from ends of said die support,
   bearing means on said connecting rails for mounting said shaft portions for oscillation on said axis and for reciprocation longitudinally of said axis over the track of the template,
   means for mounting the die to be ground upon said cylindrical support,
   a rotary grinding element,
   means carrying the grinding element on the frame on the side of the die support opposite the template and in contact with the cutting edge of the die,
   means securing the template to said slide,
   means for setting the position of the slide on the front rail to position the template with respect to the grinding element,
   means clamping the seated portion of the template to the rear rail after positioning the template, and
   a lever carried from the cylinder and extending through the opening in the template to provide means for moving the die support and having a part in position to ride upon the track of the template during movement of the cylinder for controlling contact of the cutting edge of the die with respect to the grinding element.

6. A machine for grinding the cutting edge of a die as described in claim 5, wherein said bearing means which mounts the die support includes
   bearing blocks fixed to said connecting rails for passing said shaft portions,
   sleeve members in the bearing blocks and having pairs of parallel grooves on the inner face of the sleeve with ends of each pair of grooves interconnected by transfer grooves,
   balls in one groove of each pair for supporting the shaft and movable from one groove of a pair to the other groove when the cylindrical die support is reciprocated,
   tubular housings containing the sleeve members, and
   antifriction bearings rotatably journaling the tubular housings in the bearing blocks for the oscillatory movement of the die support.

7. A machine for grinding the cutting edge of a rotary die of the type for cutting openings in envelopes and like material, said grinding machine including a template having an opening therein providing a track following the shape of the cutting edge of the die,
a cylinder for mounting the die to be sharpened thereon and having an annular groove in the circumferential face thereof,
means mounting said cylinder for oscillating and reciprocating movement over the track of said template on a fixed axis,
a rotary grinding element,
means carrying the grinding element above the cylinder on a side thereof carrying the die and with the grinding element in position to contact the cutting edge of the die,
a segment member movable circumerentially in the groove of the cylinder,
an arcuate plate extending over the segment member and in contact with the cylinder to retain the segment in said groove,
a lever connected with the segment member and extending through the arcuate plate,
fastening means for securing said plate to the cylinder,
said lever extending through the opening in the template to provide means for moving the cylinder and having a part in position to ride upon the track of the template during movement of the cylinder for contact of the cutting edge of the die with respect to the grinding element, and
an adjusting screw journaled on the arcuate plate and having engagement with the cylinder to move the lever relatively to the cylinder for positioning the die with respect to the track thereby regulating the grinding contact of the cutting edge of the die with the grinding element.

8. A machine for grinding the cutting edge of a rotary die of the type for cutting openings in envelope and like material as described in claim 7, and
means for adjusting the template in the axial direction of said cylinder.

9. A machine for grinding the cutting edge of a rotary die as described in claim 7, and including
means for feeding the grinding element to and from the die carrying cylinder.

10. A machine for grinding the cutting edge of a rotary die as described in claim 7, and including
means for adjusting the template along the axial direction of said cylinder, and
means for feeding the grinding element to and from the die carried upon said cylinder.

11. A machine for grinding the cutting edge of a die of the type for cutting openings in envelope material, said grinding machine including
a frame having front and rear rails connected by rails near ends thereof,
a template supported between the front and rear rails and having an opening therein providing a track following the shape of the cutting edge of a die to be ground,
a cylindrical die support having shaft portions extending axially from ends of said die support,
bearing means on said end rails mounting said shaft portions for oscillation about the axis of said die support and for reciprocation longitudinally of said axis,
means for mounting the die to be ground upon said die support,
an upright guide fixed to the frame,
a carriage movable upon the upright guide,
a motor unit supported by the carriage and having a driven shaft depending over said die support,
a grinding element on the shaft,
a threaded shaft journailed on the guide and having threaded connection with a part of the carriage,
means for turning the shaft to move the carriage for bringing the grinding element to and from said die support,
means securing the template to said rails, and
a lever carried from said die support and extending through the opening in the template to provide means for moving the said die support and having a part in position to ride upon the track of the template during movement of said die support for controlling contact of the cutting edge of the die with respect to the grinding element 12. A machine for grinding the cutting edge of a die of the type for cutting openings in envelope material, said grinding machine including
a frame having front and rear rails connected by rails near ends thereof,
a template supported between the front and rear rails and having an opening therein providing a track following the shape of the cutting edge of a die to be ground,
a cylindrical die support having shaft portions extending axially from ends of said die support,
bearing means on said end rails mounting said shaft portions for oscillation about the axis of said die support and for reciprocation longitudinally of said axis,
means for mounting the die to be ground upon said die support,
an upright guide fixed to the frame,
a face plate movable upon the upright guide,
a hinge plate hingedly connected with the upper portion of the face plate,
a motor unit supported by the hinge plate and having a driving shaft depending over said die support,
a grinding element on the shaft,
a threaded shaft journaled on the guide and having threaded connection with the face plate,
means for turning the shaft to move the face plate for bringing the grinding element to and from said die support,
means securing the template to said rails,
a lever carried from said die support and extending through the opening in the template to provide means for moving the said die support and having a part in position to ride upon the track of the template during movement of said die support for controlling contact of the cutting edge of the die with respect to the grinding element, and
a releasable means for securing the hinge plate to the face plate and releasable to hinge the hinge plate away from the face plate for quick removal of the grinding element out of contact with the die.

13. A machine for grinding the cutting edge of a rotary die in which the cutting edge follows the shape of the opening to be cut in envelope material while under continuous movement across the die carrying cylinder in a rotary envelope making machine, said grinding machine including,
a template member providing a track following the shape of the opening to be cut,
a follower member in contact with the track,
a generally cylindrical die support corresponding to the die carrying cylinder in the envelope making machine,
means mounting the die support in the grinding machine for oscillation on its own axis and for reciprocation longitudinally of said axis,
means for mounting the die to be ground upon said die support with the cutting edge projecting radially with respect to said axis,
a rotary grinding element,
means for carrying the grinding element in the grinding machine for rotation on an axis at substantially right angles to the axis of oscillation of the die carrier and in a position to be contacted by the cutting edge, means mounting the template and track follower members in the grinding machine for movement of one with respect to the other, means connecting the die support with the movable member, and actuating means carried by the connecting means for maintaining contact of said follower member and track of the template member as they are manipulated to produce corresponding movement of the cutting edge of the die into grinding contact with the grinding element to grind the cutting edge of the die to substantially uniform radius from the axis of the die support.

14. A grinding machine as described in claim 13, wherein the cutting edge of the die to be ground has inner and outer faces, and in which the track follower has stepped annular portions of different diameter for contact respectively with the track of the template member when grinding said inner and outer faces of the cutting edge of the die.

References Cited by the Examiner

UNITED STATES PATENTS 1,424,196  8/1922  Fowler _____ 51—100

FOREIGN PATENTS 755,957  9/1933  France.

ROBERT C. RIORDON, *Primary Examiner.*

L. S. SELMAN, *Assistant Examiner.*